June 3, 1941.  H. LOWENTHAL  2,244,493
GLASS ORNAMENT WITH PIN AND METHOD OF MAKING THE SAME
Filed Jan. 13, 1941
FIG. 1.
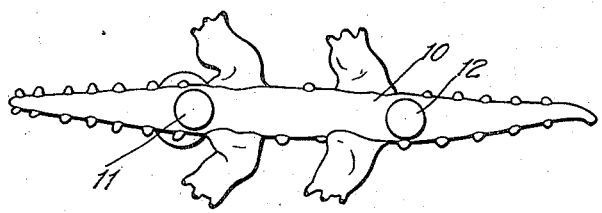
FIG. 2.
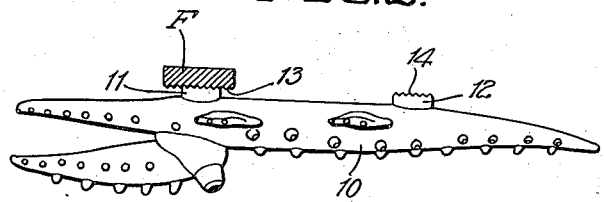
FIG. 3.
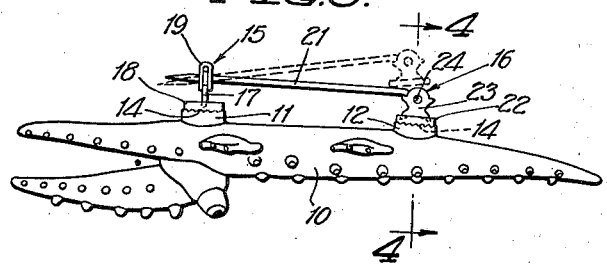
FIG. 5.    FIG. 4.
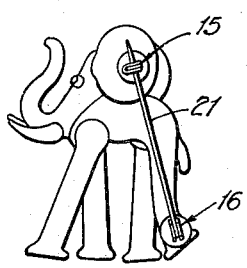   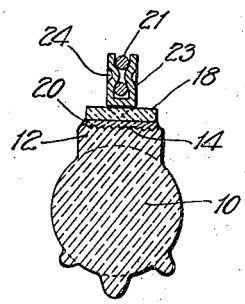
HAROLD LOWENTHAL.
INVENTOR.
BY  Ely & Pattison
ATTORNEYS.
WITNESS:

Patented June 3, 1941

2,244,493

UNITED STATES PATENT OFFICE 2,244,493

GLASS ORNAMENT WITH PIN AND METHOD OF MAKING THE SAME

Harold Lowenthal, New York, N. Y., assignor to Herbert & Pohs Inc., New York, N. Y., a corporation of New York Application January 13, 1941, Serial No. 374,159

5 Claims. (Cl. 63—20)

This invention relates to improvements in glass ornaments for pining upon coat lapels, dresses, and other outer wearing garments of ladies for decorative purposes.

In the manufacture of glass pin ornaments, great difficulty has been experienced in affixing the metal pin and its safety catch to the glass ornament. To securely fasten metal to glass without embedding the same therein has proven a difficult task and it is the primary object of this invention to securely attach the metal pin and its metal clasp to a glass ornament in a novel, inexpensive, and secure manner.

Another feature of the invention resides in a simple method of attaching a metal pin and its safety catch to a glass ornament and for accurately alining the anchorage of the pin with the safety catch to assume positive locking engagement of the pin with the catch.

Other features of the invention will become apparent as the following specification is read in conjunction with the accompanying drawing, in which:

Figure 1 is a bottom plan view of a glass ornament in the shape of an alligator prior to the attachment of the pin and safety catch.

Figure 2 is a side elevational view of the glass ornament illustrating the manner of roughening the anchoring pillars for the pin and its safety catch.

Figure 3 is a fragmentary side elevational view illustrating in full lines the pin and safety catch in attached position upon the glass ornament, and illustrating in dotted lines the manner in which the pin is alined with the attached safety catch before its attachment to the ornament.

Figure 4 is an enlarged vertical transverse sectional view on the line 4—4 of Figure 3.

Figure 5 is a rear side elevational view of an elephant design glass ornamental pin constructed in accordance with the invention.

Referring to the drawing by reference characters, the numeral 10 designates an ornamental transparent or translucent glass body having light transmitting characteristics which for illustrative purposes is shown in Figures 1 to 4 inclusive, as being in the shape of an "alligator." It will be understood however, that other designs of ornamental objects might be formed, one of which is shown in Figure 5 as an "elephant" design, and I do not wish to be limited to the particular design herein shown. In the making of solid glass articles such as ornamental objects, it is the practice to heat the glass to be worked upon so as to render the glass flexible or fusible in the presence of heat, whereupon the operator may shape the glass to the design to be produced. The glass body 10 is so formed, and after being completely shaped, the operator, while the body 10 is still fusible, applies two spaced apart light transmitting glass pillars or pedestals 11 and 12 to the rear side of the body 10, and which pillars are fused to the body so as to form an integral part thereof.

While the pillars 11 and 12 are still soft and flexible, the operator applies the ends thereof to a roughened or milled surface 13 which may be in the form of a metal file F, the ends of the pillars being pressed against the roughened surface of the file to provide a substantially flat roughened outer surface 14 on each of the pillars 11 and 12. After forming the pillars and roughening the outer surfaces thereof, the glass body is permitted to cool and consequently become hard. The next step in the operation is to apply a safety catch 15 to the pillar 11 and a pivoted pin 16 to the pillar 12. The catch 15 comprises a metal hook body 17 which has its lower end anchored and embedded in a flat clear transparent disk base 18 which is made of a plastic composition. Pivoted on the hook body is a keeper 19 for closing the hook and cooperating therewith to provide a closed eye. The operator applies a clear adhesive substance 20 either to the roughened surface 14 of the pillar 11 or on the under side of the plastic base 18 and proceeds to press the base 18 against the pillar 11. The catch 15 is applied in a manner so that the eye thereof faces in the direction of the pillar 12 and for positively alining the catch 15 with the pillar 12 to which the pin 16 is anchored, the operator inserts the pointed end of the pin shank 21 through the eye of the catch 15 and proceeds to fit the clear transparent plastic base disk 22 of the pin against the roughened surface of the pillar 12. An adhesive binder similar to the clear adhesive 20 is applied between the plastic base 22 and the roughened surface of the pillar 12 in the same manner as the plastic base of the catch 15 is applied to the pillar 11. The pin 16 also includes a metal body 23 which is embedded in the plastic base 22. The pin shank 21 is pivoted to the metal body 23 as at 24. It will thus be understood that by inserting the pointed end of the pine shank 21 through the catch 15 prior to the anchoring of the pin to the pillar 12, the pin and catch are properly alined. After adhesively securing the catch 15 and the pin 16 respectively to the pillars 11 and 12, the adhesive connection therebetween is permitted to dry and harden which produces an exceptionally rigid bond between the metal parts of the pin and catch and the glass body sufficient to hold the metal parts from becoming separated from the glass body during the pinning of the ornament upon a wearer and when removing it therefrom.

Due to the clear transparency of the plastic disks 18 and 22, the attachment or anchorage of the safety catch and pin are substantially invisible to the eye of an observer when looking at the front of the glass body. Also, when the glass body is made in various colors, the clear transparent disks 18 and 22 take on the light coloring characteristics of the colored glass body so as to effect a color blending therewith.

Although I have specifically described and shown in the drawing anchoring pillars for the pin and catch, due to the irregular surface of the "alligator" design glass body 10, I wish it to be understood that in glass articles having flat surfaces such spaced apart anchoring portions may be roughened and thereby serve the same purpose as the pillars.

In Figures 1 to 4 inclusive, the attaching pin and catch are anchored to the rear of the body of an "alligator" design, but the same may be applied to the extremities of a glass ornamental body such as the relatively flat ear and rear leg of an "elephant" design as shown in Figure 5.

While I have shown and described what I consider to be the most practical embodiment of my invention I wish it to be understood that such changes or modifications as come within the scope of the appended claims may be resorted to as desired without departing from the spirit of the invention.

Having thus described the invention, what I claim as new and desire to secure by Letters Patent of the United States, is:

1. An ornamental article to be worn upon outer garments comprising a light transmitting body having a flat pin anchorage surface, a metal pin provided with a flat light transmitting attaching base, and an adhesive bond rigidly connecting the attaching base to the pin anchorage surface.

2. An ornamental article to be worn upon outer garments, comprising a light transmitting body having a flat roughened pin anchorage surface provided on the rear side thereof, a metal pin provided with flat base of a transparent plastic composition which is seated upon the anchorage surface, and an adhesive binder between the anchorage surface and the confronting face of said base for rigidly securing the pin to said glass body.

3. An ornamental article to be worn upon outer garments comprising a light transmitting glass body of irregular shape having a pair of spaced apart flat anchorage surfaces provided on and integral with the rear side thereof, a metal pin and a metal safety catch therefor, the metal pin and metal safety catch, each having a flat base of transparent plastic composition, the flat bases of the pin and catch being respectively seated against the pair of spaced flat anchorage surfaces, and an adhesive binder securing each flat base to its related anchorage surface for rigidly securing the metal pin and metal catch to said glass body.

4. The method of making an ornamental glass pin article which consists in shaping a piece of glass by hand in the presence of heat to provide an irregular shaped ornamental glass body, providing spaced apart flat roughened anchorage surfaces to said glass body, applying and adhesively securing the flat plastic composition base of a metal safety catch to one of the roughened anchorage surfaces, inserting the metal pin shank of a pin through the safety catch, and immediately thereafter adhesively securing the flat plastic composition base with which the pin is provided to the other of the roughened anchorage surface.

5. An ornamental pin article comprising a glass body having light transmitting characteristics, a flat pin anchorage surface provided at the rear of said body, a metal pin, a flat transparent disk base to which one end of said pin is connected, said transparent disk base being seated against the flat pin anchorage, and a clear adhesive substance between the anchorage surface and the confronting face of the disk base whereby the anchorage connection between the glass body and the metal pin is substantially invisible when the article is viewed from the front thereof.

HAROLD LOWENTHAL.